(12) United States Patent
Oberhofer et al.

(10) Patent No.: US 10,621,493 B2
(45) Date of Patent: *Apr. 14, 2020

(54) MULTIPLE RECORD LINKAGE ALGORITHM SELECTOR

(71) Applicant: International Business Machines Corporation, Armonk, NY (US)

(72) Inventors: Martin Oberhofer, Bondorf (DE); Yannick Saillet, Stuttgart (DE); Scott Schumacher, Porter Ranch, CA (US); Jens P. Seifert, Gaertringen (DE)

(73) Assignee: International Business Machines Corporation, Armonk, NY (US)

(*) Notice: Subject to any disclaimer, the term of this patent is extended or adjusted under 35 U.S.C. 154(b) by 156 days.

This patent is subject to a terminal disclaimer.

(21) Appl. No.: 15/860,138

(22) Filed: Jan. 2, 2018

(65) Prior Publication Data
US 2018/0121535 A1    May 3, 2018

Related U.S. Application Data

(63) Continuation of application No. 15/331,086, filed on Oct. 21, 2016.

(51) Int. Cl.
*G06F 16/00* (2019.01)
*G06N 3/08* (2006.01)
(Continued)

(52) U.S. Cl.
CPC .............. *G06N 3/08* (2013.01); *G06F 16/215* (2019.01); *G06N 20/00* (2019.01)

(58) Field of Classification Search
CPC ......... G06F 16/215; G06N 20/00; G06N 3/08
See application file for complete search history.

(56) References Cited

U.S. PATENT DOCUMENTS

| 8,935,247 B1 | 1/2015 | Tholome et al. |
| 8,966,036 B1 * | 2/2015 | Asgekar ............... G06Q 50/01 707/706 |

(Continued)

OTHER PUBLICATIONS

Choi, Youngseok, "DYMS (Dynamic Matcher Selector)—scenario-based schema matcher selector", 2013, 8 pages, Seoul National University, Seoul.

(Continued)

*Primary Examiner* — Michelle N Owyang
*Assistant Examiner* — Xiaoqin Hu
(74) *Attorney, Agent, or Firm* — Robert Bunker; Edell, Shapiro & Finnan, LLC (57) ABSTRACT

The present disclosure relates to a method for centrally processing data records using a record linkage algorithm. The method comprises providing a centralized master repository for storing data records in a predefined data structure having a set of attributes. At least one clustering metric is provided. Clusters of records may be determined using a clustering function that is based on the at least one clustering metric. For each particular cluster, a set of configuration data for the record linkage algorithm may be defined based on a value of the clustering metric within that particular cluster. The individual data records may be assigned to one or more clusters of the clusters using the clustering metric values and the record linkage algorithm may be applied to a set of two or more individual data records assigned to at least one common cluster using the set of configuration data for the common cluster.

18 Claims, 4 Drawing Sheets

(51) Int. Cl.
*G06F 16/215* (2019.01)
*G06N 20/00* (2019.01)

(56) References Cited

U.S. PATENT DOCUMENTS

| | | | |
|---|---|---|---|
| 9,767,127 B2 | 9/2017 | Feldschuh | |
| 2004/0215606 A1* | 10/2004 | Cossock | G06F 16/337 |
| 2008/0243885 A1 | 10/2008 | Harger et al. | |
| 2009/0055382 A1* | 2/2009 | Kerschbaum | G06Q 10/06 |
| 2009/0089630 A1 | 4/2009 | Goldenberg et al. | |
| 2009/0234869 A1* | 9/2009 | Azvine | G06F 16/211 |
| 2011/0010401 A1 | 1/2011 | Adams et al. | |
| 2011/0289084 A1* | 11/2011 | Fisher | H04N 7/17318 |
| | | | 707/737 |
| 2013/0212103 A1* | 8/2013 | Cao | G06F 16/215 |
| | | | 707/737 |
| 2014/0101172 A1* | 4/2014 | Dua | G06F 16/25 |
| | | | 707/750 |
| 2014/0164420 A1 | 6/2014 | Bernier | |
| 2017/0039258 A1* | 2/2017 | Shah | G06F 16/29 |
| 2017/0053357 A1* | 2/2017 | Bowman | G06Q 40/12 |
| 2018/0113928 A1 | 4/2018 | Oberhofer et al. | |
| 2018/0144003 A1* | 5/2018 | Formoso | G06K 9/6272 |

OTHER PUBLICATIONS

Whang, Steven Euijong et al., "Pay-as-you-go entity resolution." IEEE Transactions on Knowledge and Data Engineering 25.5 (2013), 14 pages.
List of IBM Patents or Patent Applications Treated As Related, Jan. 2018, 1 page.

* cited by examiner

MULTIPLE RECORD LINKAGE ALGORITHM SELECTOR

CROSS-REFERENCE TO RELATED APPLICATIONS

This application is a continuation of U.S. patent application Ser. No. 15/331,086, entitled "MULTIPLE RECORD LINKAGE ALGORITHM SELECTOR" and filed Oct. 21, 2016, the disclosure of which is incorporated herein by reference in its entirety.

BACKGROUND

The present invention embodiments relate to the field of digital computer systems, and more specifically, to centrally processing data records using a record linkage algorithm.

Removing duplicate records or finding matches in a database is a crucial step in the data cleansing process, because duplicates can severely influence the outcomes of any subsequent data processing or data mining. The matching process for record linkage becomes increasingly complex as broader coverage of various entity lifecycles is obtained and slightly different attributes are required across different geographic regions, countries, etc. Increasing complexity constitutes one of the major challenges for record linkage algorithms.

SUMMARY

Various embodiments provide a method for centrally processing data records using a record linkage algorithm used, for example, in a master data management (MDM) system and computer program product, as described by the subject matter of the independent claims. Advantageous embodiments are described in the dependent claims. Embodiments of the present invention can be freely combined with each other if they are not mutually exclusive.

In one aspect, the invention relates to a method for centrally processing data records using a record linkage algorithm. The method comprises: providing a centralized master repository for storing the data records in a predefined data structure (e.g., a data table) having a set of attributes; providing at least one clustering metric as function of at least part of the set of attributes of a data record; determining clusters of records using a clustering function and the clustering metric as input of the clustering function; defining for each cluster of the clusters a respective set of configuration data of the record linkage algorithm based on the values of the clustering metric within the cluster; assigning the individual records to one or more respective clusters of the clusters using the clustering metric values of the individual data records; applying the record linkage algorithm to a set of two or more records assigned to at least one cluster using the set of configuration data associated to the at least one cluster.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to a MDM system for centrally processing data records using a record linkage algorithm. The MDM system comprises a centralized master repository for storing the data records in a predefined data structure having a set of attributes. At least one clustering metric as a function of at least a part of the set of attributes of a data record is provided. The MDM system is configured for: determining clusters of records using a clustering function and the clustering metric as input of the clustering function; defining for each cluster of the clusters a respective set of configuration data of the record linkage algorithm based on the values of the clustering metric within the cluster; assigning the individual records to one or more respective clusters of the clusters using the clustering metric values of the individual data records; applying the record linkage algorithm to a set of two or more records assigned to at least one cluster using the set of configuration data associated to the at least one cluster. The MDM system may for example use Hadoop (e.g., IBM's BigMatch technology) as a platform for processing the data records.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Record linkage that is implemented by the record linkage algorithm is the process of matching records from one or more databases. When applied on a single database, the record linkage process enables deduplication of data. In other words, the record linkage algorithm finds or enables pairs of records that represent the same entity (e.g., in two or more files or record groups) to be found and/or duplicate records to be identified (e.g., within a file or group of records). The record linkage algorithm may involve three steps: a bucketing or blocking step; a scoring step; and a classification step. The bucketing step may be applied with the aim to find candidate record pairs that are likely to correspond to matches, while discarding a large number of pairwise comparisons that are very unlikely to correspond to a match. The scoring step involves a matching process for comparing values across two or more records with one or more matching functions. The scoring may be based on the results of the comparison. In the classification step, the scoring output of the scoring step is used to classify a pair of records as being a match pair (or auto-match), possible match pair, or non-match pair. The possible match pairs may be classified in two or more classes e.g., based on user requirements as described below.

The present method may, for example, be deployed and used in Big Data solutions, (e.g., IBMs BigMatch technology running on IBM BigInsight, Cloudera and Hortonworks) and with information integration software (e.g., Informatica Power Center, IBM Information Server).

In one example, the clustering function may be applied on a reference sample of data records in order to determine or define the clusters. The reference sample may, for example, comprise a portion of the previously processed (and cleaned) data of the client systems. In another example, the reference sample may comprise the records to be (currently) processed (e.g., the individual records of the above embodiment). In the latter case, the assigning of records to the clusters may be performed while determining the clusters.

The central master repository is a data store, storage, or database that stores data received from multiple clients systems. This may provide a central storage of data for multiple client systems. For example, the data stored in the central master repository may be referred to as master data and may be maintained as accurately as possible (e.g., by being deduplicated and cleaned by a standardization process). The master data is the data stored in the central master repository.

A data record or record is a collection of related data items (e g, name, date of birth and class of a particular user). A record represents an entity, wherein an entity refers to a user, object, or concept about which information is stored in the record. The terms "data record" and "record" are interchangeably used.

Instead of having one single set of configuration data for the bucketing, scoring and classification steps, which is the same for all analyzed records, the present disclosure uses different configurations (e.g., at runtime) depending on the characteristics of the single records. Which configuration is used for which records depends on the records. For that, the present method may cluster the records to analyze in different groups or clusters requiring different algorithms Different configurations for an algorithm may result in different algorithms. The clustering may automatically be performed using a clustering algorithm or using user defined clusters. Different bucketing, scoring, and classification algorithms may be configured for each different cluster of records. For example, this may be done by configuring multiple matching algorithm configurations with different matching attributes, configuring multiple different lower and/or upper thresholds pairs for the different matching algorithms and/or prioritizing the records of the non-match pairs that need further user interactions into multiple categories. This may enable a cascading scoring method which may avoid conventional matching on large numbers of data records which is computationally intense.

The record linkage algorithm involves a matching process that may be a very computationally intensive task. For matches or duplicates to be found across two datasets of size n, potentially up to $n^2$ comparisons may be required. The present method may solve that problem through bucketing, which may rapidly narrow down the search space by reducing the size of records to be processed at once and/or by enabling a distributed processing of the records (e.g., IBM BigMatch on a Hadoop Cluster). With the present method, the bucketing step is further optimized because records that are assigned to different clusters based on certain metrics or measures (e.g., completeness) which are useful to determine if a record is a lead (sparsely populated, matching should typically only produce a binary non-match/auto-match decision) versus another record (very richly populated attributes, matching should at least produce non-match/clerical/auto-match classification).

Another advantage of the present method may reside in improving the precision of the matching results by being able to factor on one or more clustering metrics such as completeness of records.

The present method may further have the advantage of improving the flexibility in configuring the matching capabilities for different requirements taking into account the configuration evolution of the client systems using record linkage. An example may be a roll-out from a single country to multiple countries. For example, in Europe this could lead to additional fields like second last name in Spain, different address structures (compare an address from UK versus an address from Germany), etc.

The present method may save processing resources that would otherwise be required for using complex indexing. For example, the present method may enable optimized index structures by avoiding composite indexes that can be built on different attributes (e.g., for indexing records to be bucketed). For example, instead of inserting all records to be processed into a single index data structure, the present method may store only the records with the same grid or cluster identifier (e.g., belonging to the same cluster) in the index structure related to that cluster. This may provide index structures with reduced sizes (e.g., memory size) compared to a composite index structure that is much larger in size.

According to one embodiment, the clustering metric (or clustering variable) comprises at least one of: record completeness of a data record, the completeness characterizing a ratio of a number of attributes of the data record comprising data values to a total number of attributes in the set of attributes; and a location of the data record specifying the geographic context related to an entity described by the data record. Other clustering metrics may comprise culture conditions data of a client system and/or a configuration state of the client system. For example, for each configuration state the client system may provide records having a respective completeness.

The content of a client system's records may develop over time (e.g., more and more fields or attributes of the data records get populated). That means more fields or attributes are populated when matching records to detect duplicates, and the match algorithm can factor in more and more attributes for the decision whether or not two or more data records are duplicates. As a consequence, the probability that the matching decision is accurate may increase by comparing data records with the same completeness level of populated attributes. Different matching configurations may be determined for different completeness levels.

For example, data records received from client systems may have an unknown structure that does not correspond, for example, to predefined structures at the MDM system. This embodiment may not rely on predefined structures as it dynamically defines the structure of a received record by for example evaluating the clustering metrics.

According to one embodiment, the method further comprises receiving data records from client systems, and storing the received data records in the master repository until reaching a predefined set of records, the set of records comprising the individual records. This may provide a controlled data sample used for running the record linkage algorithm.

According to one embodiment, the method further comprises dynamically determining the set of metric thresholds based on the individual data records. The dynamically determining may comprise determining the metric thresholds such that the number of records per cluster is higher than a predefined minimum number of records. This may enable an automatic clustering method based on the records to be processed. This may also provide an accurate clustering that reflects the current status of the system. The current status is defined by the individual records that are to be processed by the present method.

According to one embodiment, the method further comprises, in response to the assigning of a given record to more than one cluster, repeating the assigning and the applying steps on a predefined time periodic basis for the given record. This may take into account updates that may happen on the given record. For example, the given record may have a metric value of the location metric that covers more than one cluster (e.g., clusters that represent different EU countries); however, the metric value of the given record covers the entirety of Europe. In this case, the client system that sent the given record may subsequently send further specific information specifying, for example, that the given record indeed belongs to Germany In this case, the repetition of the assignment step may reassign the given record to the cluster representing records related to Germany.

According to one embodiment, the set of configuration data comprises at least one of: a list of bucketing attributes of the set of attributes that can be used for bucketing, a list of matching attributes of the set of attributes that can be used for matching between records, a minimum number of common attributes that can be used for the bucketing and matching processes, a maximal size of the records per cluster, a type of comparison functions for the matching process, weights associated with the set of attributes that can be used in the scoring step maximal number of different bucketing processes, which blocking or bucketing method, and different sets of classification thresholds.

According to one embodiment, the applying of the record linkage algorithm comprises:

assigning records of the set to one or more buckets using one or more bucketing attributes of the set of attributes (referred to as bucketing step); and for each bucket and each pair of records of the each bucket:

estimating (e.g., using one or more matching functions) the matching probability and/or non-matching probability for matching attributes of the set of attributes, (referred to as scoring step);

using the probabilities for classifying the pair as a match pair, possible match pair or non-match pair (referred to as classification step).

According to one embodiment, the method further comprises using the probabilities for calculating a matching score for the pair of records, wherein the classification is performed by comparing the matching score with one or more predefined classification thresholds. The matching score is calculated as part of the scoring step using one or more matching methods such the edit distance method. The classification thresholds may for example comprise a lower and upper threshold as described below. For example, the set of configuration data of each cluster may comprise respective classification thresholds.

In another example, a machine learning classification algorithm (e.g., tree classification or neural network) trained with a predefined training data sample may be used to automatically perform the classification using the probabilities.

The matching attributes may comprise at least part of the set of attributes. For example, the matching attributes may or may not comprise the bucketing attributes.

A match pair refers to a pair of records that match each other (e.g., have similar attributes values where similarity may be measured by edit distance, phonetic comparison, nickname resolution, transliteration, etc.). A non-match pair refers to a pair of records that do not match each other. A possible match pair refers to a pair of records that may match each other and may need to be further processed. The further processing may for example comprise prompting a user to provide user inputs (e.g., based on a clerical review or user review) and upon receiving user inputs, applying the user inputs to the possible match pair of records to decide whether the possible match pair is a match pair or a non-match pair. For example, two classification thresholds may be defined, a lower and upper threshold. If the matching score is between the lower and the upper thresholds this indicates a possible match. If the matching score is higher than the upper threshold this indicates a match. If the matching score is less than the lower threshold this indicates a non-match. In another example, further classification thresholds may be provided for classifying the possible match pairs of records into different user groups of records, such that each user group of records may require respective user inputs (indicating a clerical category) for further checking the records of the user group.

According to one embodiment, in case the number of pairs classified as non-match pairs is higher than a predefined maximum number, the assigning, estimating, and classification steps may be repeated using other bucketing attributes. This embodiment may perform another bucketing pass until a predefined number of bucketing passes (e.g., a predefined number of repetitions) is done. This embodiment may increase the efficiency of the record linkage algorithm in detecting or identifying matches.

According to one embodiment, the matching is performed using a predefined one or more matching functions. In case the pair is classified as a possible match pair, the method comprises repeating the matching step using other matching functions and repeating the classification step (based on the result of the other matching functions). This may improve the classification results (e.g., high priority clerical category, medium priority clerical category, etc.).

According to one embodiment, the calculating of the matching score comprises: using the probabilities to calculate an individual matching score for each attribute of the matching attributes; calculating the composite score from the individual matching scores of all the matching attributes, wherein the matching score comprises the composite score.

For each matching attribute, an individual matching score may be calculated using the matching probability and/or non-matching probability. The matching score may be defined as a composite score, wherein the composite score is the average of all the individual matching scores. This may be advantageous in case each matching attribute contributes equally. In another example, the composite score is the weighted average of all the individual matching scores, wherein each matching attribute is assigned a weight indicating the amount of contribution of the matching attribute to the total weight. For example, for a value of attribute ZIP code, if "999" occurs more often than value "1009," a match of "999" carries less weight than a match of "1009," as the agreement on rarely occurring values of an attribute may be better at distinguishing matches than that on commonly occurring values of the attribute.

According to one embodiment, in case the pair is classified as a match pair executing a survivorship algorithm on the pair of records. The survivorship algorithm may be configured to assemble a single record from the records of the pair by merging the two or more records. This may for example be done by selecting one record of the pair as a master record. In case attribute level survivorship is applied, best in breed attribute selection may be done across the 2 or more records. For example, if the master record has attributes without values that are present in the other records, those values of the other records may be stored in the master record, and the resulting master record is the single record.

According to one embodiment, the matching attributes comprise the bucketing attributes. In other words, the attributes used for the bucketing step may be the same attributes used for the scoring step. This may provide a consistent and non-biased execution of the record linkage algorithm.

According to one embodiment, the calculating of the matching score being iteratively performed comprises: a) providing a ranked list of matching functions; b) executing the highest ranked matching function; c) comparing the matching score with a predefined threshold; in case the matching score is less than the predefined threshold exiting the iteration process; in case the matching score is higher than the predefined threshold, repeating the executing and comparing steps b)-c) with a following ranked matching function until all the matching functions are processed. In other words, all scoring functions are not executed if, on a first scan, the records are not worth it. For example, the matching score calculated by the last processed matching function or method is used for classification. This embodiment may enable a cascading scoring method that may provide an accurate matching evaluation of the pair of records.

According to one embodiment, assigning individual records to a respective cluster of the clusters using the clustering metric of the data record comprises: calculating the clustering metric for the data record; assigning the data record to a cluster whose boundaries encompass the calculated clustering metric. In another example a cluster scoring function may be applied on the clustering metric values of the data record. In other words, the clustering may be done using dimension measures around completeness, geography, culture conditions data, lifecycle or configuration state of the client system, etc.

According to one embodiment, the applying of the record linkage algorithm being performed in case one of the following criterion is fulfilled: at least one record of the set of records is a new record that is received for storage on the master repository; the content of at least one record of the set of records is changed by an update or change operation of the master repository. This embodiment may provide conditions for triggering the record linkage algorithm on a given set of records.

According to one embodiment, the method further comprises: calculating a current value of the clustering metric of the changed data record; and in response to determining that the current value is different from the previous value of the clustering metric of the changed record, reassigning the changed record to a corresponding cluster based on the current value. This may provide an up-to-date clustering method that takes into account data change over time.

According to one embodiment, the set of records are part of respective set of records received from respective client systems. For example, the set of records may represent different entities. The set of records may belong to a same file or two respective files.

For example, the individual records may be received from one or more client systems. The individual records may be collected in one or more files, wherein a file is a collection of related records (e.g., a file of records may be created per client system). In another example, a file may contain records of all client systems of a given user.

According to one embodiment, the method is performed at real-time or at runtime of the MDM system. For example, as soon as the individual data records are received or stored the present method may be executed.

Figure 1:
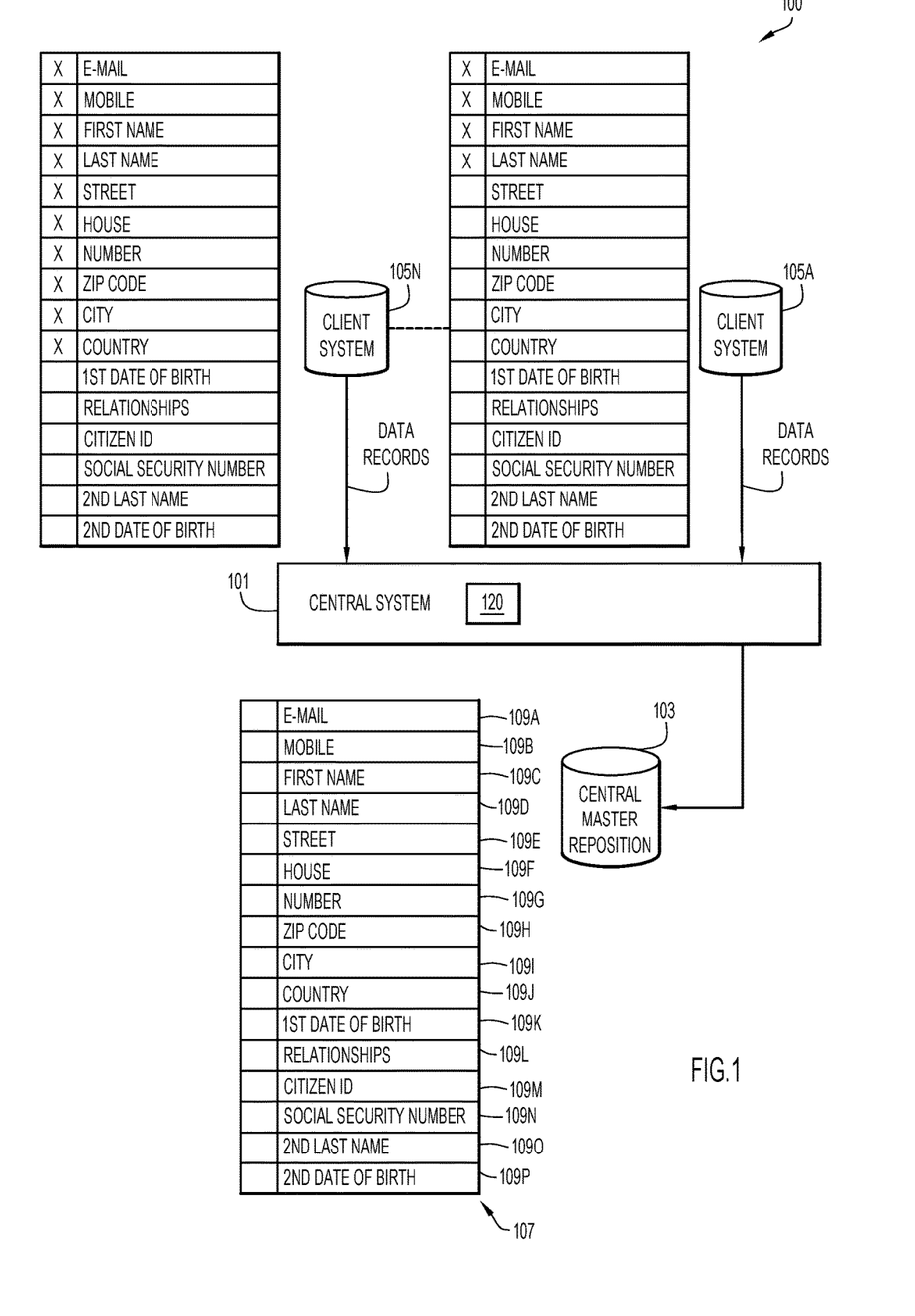
FIG. 1 depicts a block diagram representation of a master data management system, according to one present invention embodiment.

FIG. 1 depicts an exemplary master data management system 100. The master data management system 100 comprises a central system 101 and one or more client systems (or systems) or data sources 105A-N (collectively referred to as 105). The client system 105 may comprise a computer system (e.g., as described with reference to FIG. 3). The central system 101 may control access (read and write accesses etc.) to a central master repository 103. Central system 101 may process records received from client systems 105 and store the data records into central master repository 103. The client systems 105 may communicate with the central system 101 via a network connection which comprises for example a wireless local area network (WLAN) connection, WAN (Wide Area Network) connection, LAN (Local Area Network) connection or a combination thereof.

The data records stored in the central master repository 103 may have a predefined data structure 107 (e.g., a data table with multiple columns and rows). The predefined data structure may comprise a set of attributes 109A-P (e.g., each attribute representing a column of the data table 107). In another example, the data records (e.g., representing master data) may be stored in a graph database as entities with relationships. The predefined data structure may comprise a graph structure where each record may be assigned to a node of the graph.

For example, the client systems 105 may be configured to provide or create data records having the predefined data structure 107. Each client system 105 may be configured to send the created data records to the central system 101 in order to be stored on the central master repository 103 and processed in accordance with an example method of the present disclosure.

In one example, central system 101 may import data records from a remote client system 105 via HyperText Transport Protocol ("HTTP") communication or other types of data exchange. The central system 101 and/or client systems 105 may be associated with, for example, Personal Computers (PC), servers, and/or mobile devices.

Each data record received from client systems 105 by the central system 101 may or may not have all values of the set of attributes (e.g., a data record may have values of a subset of attributes of the set of attributes and may not have values for the remaining attributes). For example, FIG. 1 shows that client system 105A has records having attributes with values (indicated by cross signs or x's) such as Email 109A, Mobile phone number 109B, First Name 109C and Last Name 109D and remaining attributes 109E-P have no values. FIG. 1 also shows that client system 105N has records having attributes with values (indicated by cross signs) such as attributes 109A-J and remaining attributes 109K-P have no values. The remaining attributes having no values may be maintained empty in one example. In another example, a predefined dummy value may be stored therein such that the central system 101 may recognize that an attribute having a dummy value is equivalent as having no value.

A client system 105 may be configured to produce or create data records having different completeness. The completeness is the ratio of number of attributes of a data record comprising data values to a total number of attributes in the set of attributes 109A-P. In the example shown in FIG. 1, the completeness for the illustrated record of client system 105A is 21% (4/19). The completeness for the illustrated record of client system 105N is 53% (10/19). Data records may be produced with different completeness in order to reflect the running status of the client system 105.

Although the present example is described in terms of a few attributes, more or less attributes may be used.

The central system 101 may process the data records received from the client systems 105 using a record linkage algorithm 120 in order to find pairs of records that represent the same entity (e.g., in two files) and/or identify duplicate records (e.g., within a file).

The record linkage algorithm 120 comprises instructions that when executed performs the following steps:

Bucketing or blocking. For performance reasons, not every record should be compared with every other record. Bucketing comprises grouping records which look related to a particular dimension (e.g., a clustering metric represents a respective dimension) similarly, by selecting possible pairs for linking from the client systems 105 using one or more bucketing attributes. For example, a bucketing attribute may comprise a single attribute such as ZIP code 109H (e.g., the pairs would consist of only records where ZIP code agree), or a multiple attributes e.g., comprising ZIP code 109H, Last Name 109D and date of birth e.g., 109K. This means records with similar values are close to each other and therefore may be grouped in the same bucket. Thus, the bucketing or blocking step may be applied with the aim to find candidate record pairs that are likely correspond to matches, while discarding a large number of pairwise comparisons that are very unlikely to correspond to a match.

Scoring. The scoring may be performed on buckets resulting from the bucketing step. For example, once a candidate list of similar looking records is found (a candidate list may comprise at least part of a bucket of records) values across two or more records are compared with different similarity measuring techniques or matching functions (e.g., edit distance, format translation, nickname resolutions, etc.) and a weight (e.g., per attribute) expressing how close the values are and how much this attribute contribute to the final matching decision is computed. For example, the edit distance for the last name attribute may create an Equal Word hit whereas the first name attribute may result using a nickname resolution in a similarity result. Thus, the weight for last name in comparison to the first name indicates that the last name contributes more to the final decision if the records which are compared will be considered the same or not.

Classification. The outcome of the second step classifies the result in either non-match, clerical (or possible match) and auto-match where two thresholds may be defined separating non-match and clerical (lower threshold) and clerical and auto-match categories (the upper threshold).

The present disclosure may enable configuration of the MDM system 100 at the design phase and/or at the runtime phase of the MDM system 100. At runtime, the MDM system may receive data records from clients systems to be processed. The design phase may be the phase before running the MDM system 100 or the phase subsequent to roll out phases if additional functionality is rolled out or adjustment of existing tuning.

Figure 2:
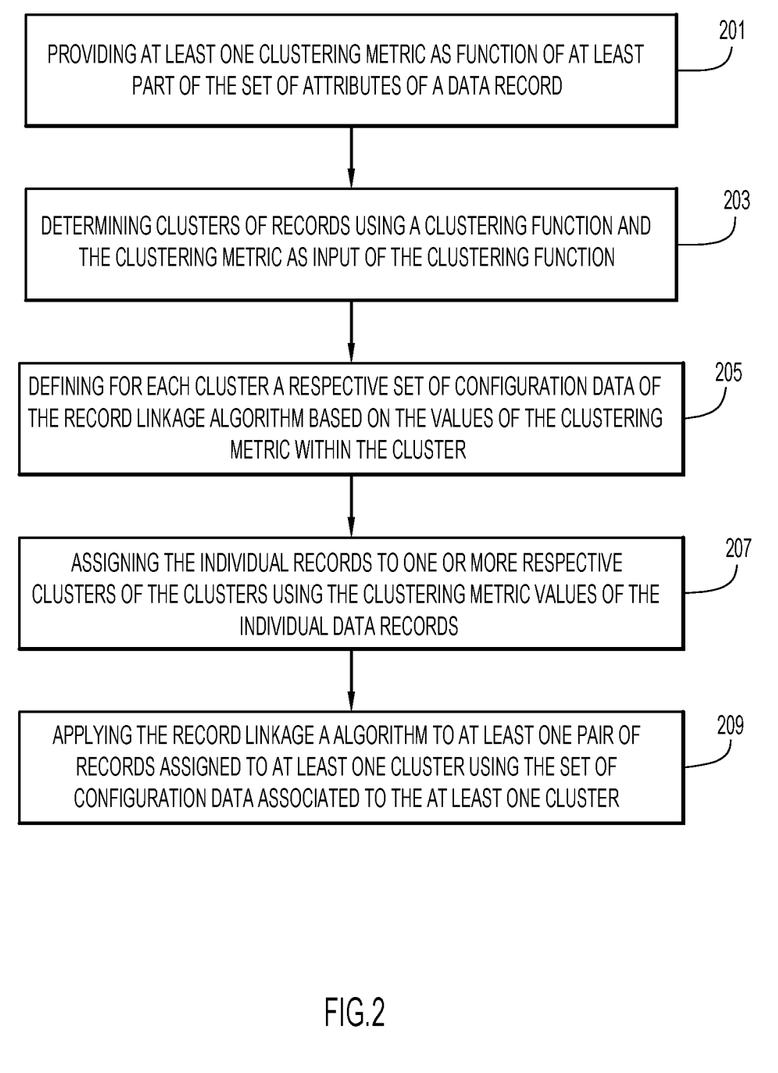
FIG. 2 is a flowchart of a method for processing data records using a record linkage algorithm, according to one present invention embodiment.

FIG. 2 is a flowchart of a method for centrally processing data records using a record linkage algorithm (e.g., algorithm 120). The data records may have a data structure 107 having a set of attributes 109A-P as described above with reference to FIG. 1.

In step 201, at least one clustering metric or clustering variable may be provided. The at least one clustering metric may be defined as a function of at least a part of the set of attributes of a data record. In another example, a clustering metric may comprise one or more attributes of the set of attributes. The at least one clustering metric may be evaluated for each data record in order to be processed by the record linkage algorithm 120 in accordance with the present example.

Figure 2A:
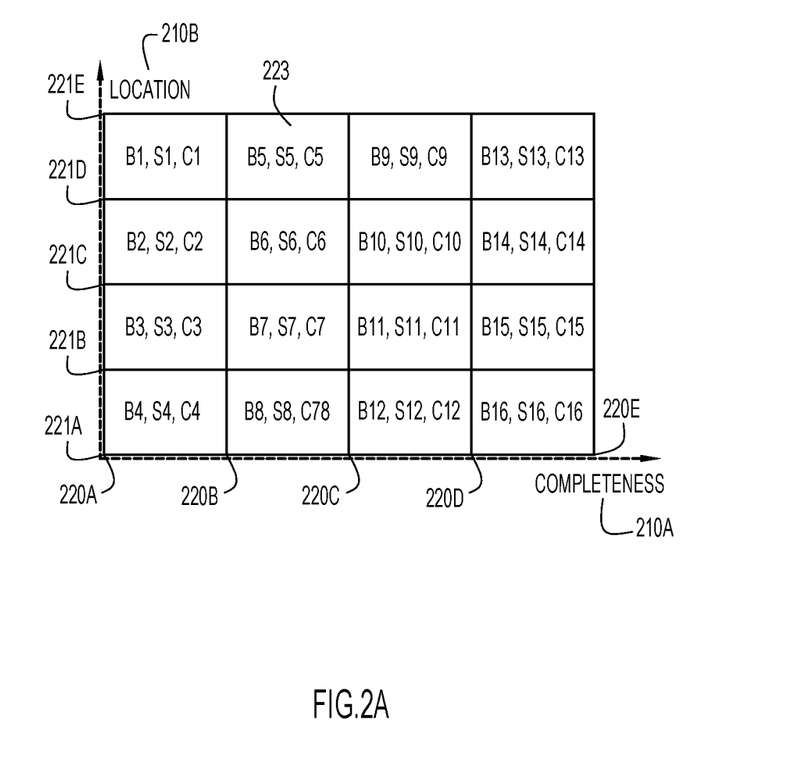
FIG. 2A illustrates clustering metrics, according one present invention embodiment.

FIG. 2A shows an example of clustering metrics. In the example of FIG. 2A, the at least one clustering metric comprises two clustering metrics 210A and 210B. Only two clustering metrics are shown for simplification purposes; however, one or more clustering metrics may be used.

Clustering metric 210A is the completeness of a data record which is defined as the ratio of number of attributes of a data record comprising data values to a total number of attributes in the set of attributes 109A-P. In the example shown in FIG. 1, the completeness for the illustrated record of client system 105A is 21% (4/19).

Clustering metric 210B is the location of the data record specifying the geographic context related to an entity described by the data record. For example, the location may indicate that the entity described by the data record is located in Europe. In this example, the location may be an attribute of the set of attributes.

For example, the central system 101 may comprise data indicating a list of clustering metrics, wherein each clustering metric may be associated with a property in the list. The property may have a value that indicates the type of client systems for which the associated clustering metric is suitable. Using that property, the at least one metric of step 201 may be determined or defined. For example, the data records to be processed are received from client systems that are all associated with the at least one metric. Upon receiving a data record from a client system, the client system is identified using data of the received record and the clustering metric suitable for that client system may be found in the list of clustering metrics.

In step 203, each of the clustering metrics 210A-B defined in step 201 may be associated with a respective set of metric thresholds 220A-E and 221A-E. The set of metric thresholds 220-221 define cluster boundaries of clusters 223. For example, cluster 223 is defined by boundaries 220B-C of the completeness metric 210A and boundaries 221D-E of the location metric 210B. This may result in a n-dimensional grid of clusters where n is the number of clustering metrics of the at least one clustering metric (in FIG. 2A, n=2).

In another example, step 203 may be performed using a subset of clustering metrics of the clustering metrics determined or provided in step 201, e.g., the subset of clustering metrics may randomly be selected among the clustering metrics of step 201.

Step 203 may be performed using a clustering function. The clustering function may be configured to associate metric thresholds with the respective clustering metric.

In another example, the clustering function may comprise a multivariate analysis using the clustering metrics of step 201 as inputs and a reference data sample of records. The clustering function groups or clusters the reference data sample in such a way that records in the same cluster are more similar to each other than to those in other clusters. The result of applying the clustering function on the reference data sample is the clusters, wherein each cluster is defined by (e.g., by metric boundaries) values of the clustering metrics.

The clustering function may select a subset of clustering metrics from the clustering metrics of step 201 that are suitable for providing the clusters. For example, the clustering metrics provided in step 201 may be used as input to the clustering function. The clustering function may process the reference data sample using different subsets of clustering metrics of the clustering metrics of step 201 and for each subset of clustering metrics a respective set of clusters may be determined. The different sets of clusters may be compared (e.g., based on a comparison criterion) in order to select one set of clusters which forms the clusters of step 203. The selected set of clusters has a corresponding subset of clustering metrics. The comparison criterion may for example comprise the number of records per cluster.

In one example, the boundaries 220-221 may be dynamically determined (e.g., as soon as the data records to be processed become available after being received or after being collected or after being stored at the central master repository 103). The determination of the boundaries 220-221 may be based on the records to be processed. In another example, the determination of the boundaries 220-221 may be performed using a reference data sample that is different from the records to (currently) be processed. For example, the thresholds 220-221 may be determined such that the number of records per cluster is higher than a predefined minimum number of records. This may be performed by, for example, evaluating the clustering metrics 210A-210B for each data record to be processed and using the evaluated values to find the boundaries, such that each cluster has at least the minimum number of records. This may be advantageous as it may provide clusters that reflect the current set of records being processed.

In another example, the boundaries 220-221 may be predefined (e.g., user defined). The user of the central system 101 may provide inputs to the central system 101 indicating the boundaries 220-221. For example, the list of clustering metrics may further indicate the boundaries for each clustering metric.

In the example shown in FIG. 2A, the resulting clusters are in the form of a two-dimensional grid. In this case there are 4*4=16 possible matching configurations and, thus, a total of 16 grid or cluster identifiers. The 16 grids may be represented by an n-dimensional array, wherein each element of the array may be assigned to a respective grid. Every field in the grid (or each element of the n-dimensional array) has a bucketing ($B\_i$), a scoring ($S\_i$), and a classification ($C\_i$) configuration. In support of the bucketing for each grid field, index data structures to quickly find a record which belongs into the configuration of that grid may be maintained. However, other examples of metric thresholds may be used. For example, multiple center values and associated radius value may be determined for clustering metrics such that a circle of metric values may be built using a center value as the center and the radius value as the radius of the circle. The center value may be a pair of values of the two clustering metrics 210A-B. In this case, the center value and the radius define boundaries of the cluster being in the form of a circle.

The examples provided herein are described for simplification purposes in terms of geometries such as circle or grid that are defined by using two clustering metrics. However, the clustering may use a higher number of clustering metrics and the resulting clusters may not be explained in term of simple geometries.

In step 205, each cluster 223 resulting from step 203 may be assigned a respective set of configuration data (Bi, Si, Ci) of the record linkage algorithm 120 based on the values of the clustering metric within the cluster. For example, cluster 223 is assigned the set of configuration data (B5, S5, C5). The set of configuration data is illustrated in FIG. 2A by tuple (Bi, Si, Ci) where i refers to the cluster. Bi, Si and Ci refer to the configuration parameters for bucketing, scoring and classification steps, respectively. Bi indicates the values of the configuration parameters that can be set for the bucketing step or process. Si indicates the values of the configuration parameters that can be set for the scoring process or step. Ci indicates the values of the configuration parameters that can be set for the classification process or step. For example, two or more tuples (Bi, Si, Ci) may share at least part of the tuple (e.g., having the same Si or Ci or Bi).

The resulting tuples may be stored in an n-dimensional array representing the n-dimensional grid. Each tuple may be stored in a respective entry or element in the n-dimensional array. For example, each tuple of $B\_i$, $S\_i$ and $C\_i$ is distinct (e.g., the buckets $B\_i$ may be different for each cluster). The scoring setup $S\_i$ and/or the classification operation $C\_i$ might be used in more than one entry in this n-dimensional array. Each element of the n-dimensional array corresponds to or represents a cluster or grid 223.

The record linkage algorithm 120 may have configuration parameters whose settings control execution of the record linkage algorithm 120. The configuration parameters may for example be used to control execution of at least part of the three execution steps of the record linkage algorithm 120 described above. The use of suitable parameter settings per cluster may enhance the performance of the record linkage algorithm 120 compared to the case where default parameter settings are initialized at once for all records. A configuration parameter may for example be numerical, ordinal (e.g., low, medium, or high) or categorical (e.g., choice of heuristic). Categorical parameters can be used to select and combine discrete building blocks of an algorithm to be processed.

For example, the set of configuration data may be user defined. In this case, step 205 may comprise prompting a user of the central system 101 for providing set of configuration data for each cluster and in response to prompting the central system 101 may receive the set of configuration data for each cluster 223 of the clusters resulting from step 203*.

In another example, the set of configuration data (Bi, Si, and Ci) may automatically be determined using the predefined list of clustering metrics that indicate the set of configuration data that is suitable for a given value or set of values of a clustering metric. In case the set of configuration data determined for a clustering metric (e.g., metric 210A) are different from the set of configuration data for another clustering metric (e.g., metric 210B), one of the two set of configuration data may be used. For example, a ranking of the clustering metrics may be performed. And the set of configuration data of the highest ranked metric may be used. In another example, the first set of configuration data of the two sets of configuration data may be used to run the record linkage algorithm 120 and the second set of configuration data of the two sets of configuration data may be used to run the record linkage algorithm 120 again. This may provide a reliable tool for cross checking the result so the record linkage.

The configuration parameters may for example comprise: a list of bucketing attributes of the set of attributes 109A-P that can be used for bucketing, matching attributes of the set of attributes 109A-P that can be used for matching between records, a minimum number of common attributes that are used for the bucketing and matching processes, a maximal size of the records per cluster, the type of comparison functions for the matching process, false non-match rate, maximal number of repetitions of the bucketing process, which blocking or bucketing method. For example, a bucketing method may comprise a sorted neighborhood blocking method, bigram indexing blocking method or canopy clustering blocking method.

In one example, if the received records have a lower completeness which may be an indication that they may not yet be of interest for final analysis by the client systems, the cost of record linkage may be kept as low as possible. Therefore the lower and upper thresholds (that define the states match, non-match and possible match) may be defined such that they are either the same or close to each other. There may be categories where there is no clerical (possible match) category (lower=upper threshold) in all other cases the clerical range (distance between lower and upper threshold) could be divided into any number of clerical categories as needed depending on comparison function and rules defined for the records to determine the priority of the task for the user. Each clerical category may require respective user inputs. For example, a clerical category may require a user input indicating 0 or 1 where 0 indicates that the possible match pair is a non-match pair while 1 indicates that the possible match pair is a match pair. In another example, a clerical category may require a user input indicating one or more further matching functions that can be used to further check whether the possible match pair is a non-match pair or is a match pair. In another example, a clerical category may require a sequence of user inputs following a priority scheme. For example, a matching function may first be requested from the user, and upon receiving the matching function and applying it, a second request may be sent to the user to request user inputs indicating, based on the result of the matching function, whether the possible match pair is a non-match pair or is a match pair.

In step 207, individual records may be assigned to one or more respective clusters of the clusters 223 using the clustering metric values of the individual data records. The clustering metric values are values of the clustering metrics used to determine the clusters of step 203. For example, in case the clustering function uses a subset of clustering metrics of step 201 to determine clusters of step 203, the clustering metric values are values of the subset of clustering metrics.

For example, the individual data records may be existing records that are stored in the central mater repository 103 before the present method is performed.

In another example, the individual data records may be records that are received from the client systems 105 and buffered until reaching a predefined amount of data that can be processed by the record linkage algorithm 120. The buffering may, for example, be performed in a memory of the central system 101. Step 207 may thus be performed on buffered data records.

In a further example, the present method may be performed upon receiving a single record, and the record linkage algorithm 120 is applied on the received record in addition to the records (at least one record) that are previously stored by the central system 101. For example, the individual records are received one after each other and each received record is assigned to a respective cluster and may then be compared with the records assigned to that cluster.

For each record r, if a service request is CREATE or (UPDATE and CHANGE CRITICAL FIELDS) or SEARCH, then step 207 may be performed. The update may trigger step 207 if the change to the updated record would cause a change in the assigned cluster of record r.

In order to identify a cluster to which record r belongs a comparison of the clustering metric values of the record to the defined boundaries of the grid may be performed. In another example, a clustering scoring function may be applied on the record r in order to assign it to a given cluster.

In another example, the clusters may be defined by their center (e.g., the center of the grid) and each record may be assigned to the cluster whose center is the closest to the record. In this example, the boundaries of the cluster may not be used; only the proximity of the record to the center of the clusters may be used. This may particularly be advantageous in case the number of clustering metrics used for the clustering is too high.

For example, an index data structure may be created for each cluster of the clusters and each record may be indexed or inserted in the index data structure of the cluster to which the each record is assigned. This may enable (e.g., at the bucketing step) to quickly find a record which belongs to a cluster.

In one example, a record may belong to multiple clusters. For example, initially it is only known that the record belongs geographically to Asia, but it might not be immediately known if it belongs to China, South Korea, Malaysia, Japan, etc. Consequently, this example may allow this record into multiple clusters until an update is received which enables a precise decision as to which cluster the record should be placed (and allows the records to be removed from all other clusters). This may particular be advantageous if a clustering metric is determined based on an attribute that represents a group item. For example, an 'address' may be a 'group item' as it is usually divided into sub-items such as house-number, street number, locality, city etc.

In step 209, the record linkage algorithm 120 may be applied to a set of two or more records assigned to at least one cluster 223 using the set of configuration data associated to the at least one cluster. For example, records of each cluster (e.g., resulting from step 203) may be processed separately using the respective set of configuration data (by applying the record linkage algorithm 120 on the records). The clusters may for example be processed in parallel using multiple processors of the central system 101. In another example, step 209 may comprise receiving a selection of clusters and number of records per cluster to be processed by the record linkage algorithm 120. The number of records may comprise for example all records assigned to the cluster. In another example, the number of records may comprise or one or more records assigned to the cluster (e.g., randomly selected one or more records).

For example, the individual records are received one after each other and each received record is assigned to a respective cluster and processed in accordance with step 209 by applying the record linkage algorithm 120 on possible pairs of records of the cluster, wherein each pair includes the received record and another record previously assigned to the same cluster. The records that were previously assigned to the clusters may have been processed by the record linkage algorithm (e.g., they are deduplicated).

The set of configuration data associated with the at least one cluster may be obtained by retrieving for the identified at least one cluster the appropriate configuration comprised of a tuple (B_i, S_i, C_i) where B_i is the bucketing configuration, S_i is the scoring configuration and C_i is the classification configuration.

If a data record is assigned to a given cluster which means that it is associated with a given element (e.g., cluster identifier) of the n-dimensional array and an UPDATE is performed on the data record such that the new element (new cluster identifier) of the n-dimensional array that represents the updated data record is different from the given element, then the data record may be removed from the index data structure of the given cluster and may be inserted in the index data structure of the new cluster.

In one example, each pair of records (of the set of records) of each cluster resulting from step 203 may be processed in step 209. In another example, each pair of records (of the set of records) of a predefined set of clusters may be processed in step 209. This may particularly be advantageous for data testing purposes.

The application of the record linkage algorithm may be performed using a batch execution for finding matching records between record sets where for each record in one set the check against the second set is done using the present method.

The applying of the record linkage algorithm 120 to the set of two or more records assigned to the at least one cluster 223 may comprise the following steps:

The bucketing method may be executed using configuration data indicated by B_j. The scoring method may be executed using configuration data indicated by S_i and matching scores may be calculated. For example, the scoring method may be applied as follows. A highest priority scoring function is executed. If the scoring function result is higher than a threshold continue executing a next scoring function, otherwise abort the scoring method.

Matching scores may be aggregated to determine the matching score and decide non-match, clerical (possible match) or auto-match by comparing the overall weight with predefined thresholds. If the result is non-match, nothing may be done. If the result is auto-match, survivorship rules may be executed on the matched records. If the result is clerical (or possible match), clerical categories may be retrieved from the entry in the n-dimensional array related to the matching algorithm configuration. This may be done by categorizing clerical results into clerical categories based on a weighted combination of clerical category indicators, which yields a task priority for the data stewards to work on. For example, results of comparison functions such as edit distance may be used as follows: edit distance=0 being an exact match would be an indicator for a higher clerical category whereas edit distance=7 would be a lower clerical category indicator). In another example, rules related to the data record in question (e.g., a given client system 105A has higher priority compared to client system 105N).

Figure 3:
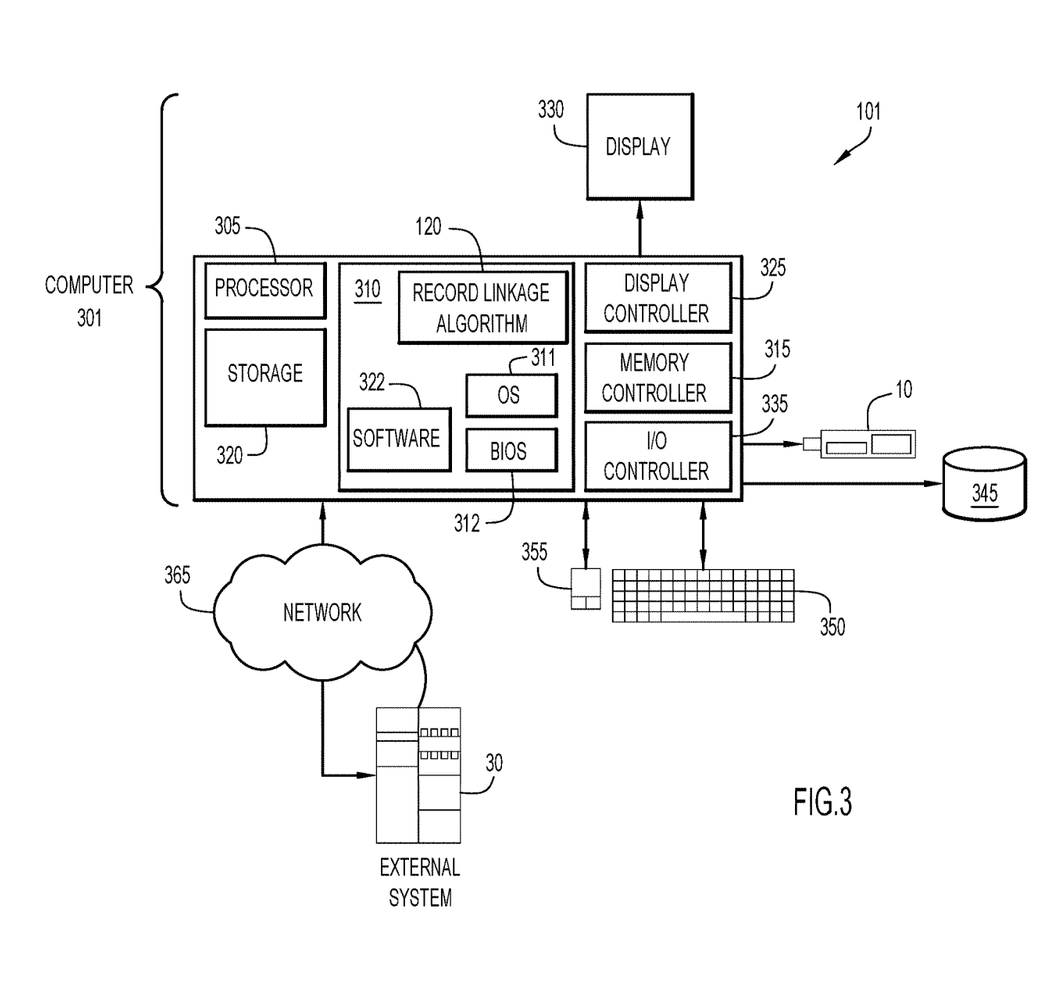
FIG. 3 represents a computerized system, suited for implementing one or more method steps as involved in the present disclosure, according to one present invention embodiment.

FIG. 3 depicts an example hardware implementation of central system 101. FIG. 3 represents a general computerized system, suited for implementing method steps as involved in the present disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 322 (including firmware 322), hardware (processor) 305, or a combination thereof. In exemplary embodiments, the methods described herein are implemented in software, as an executable program, and is executed by a special or general-purpose digital computer, such as a personal computer, workstation, minicomputer, or mainframe computer. The most general system 101 therefore includes a general-purpose computer 301.

In example embodiments, in terms of hardware architecture, as shown in FIG. 3, the computer 301 includes a processor 305, memory (main memory) 310 coupled to a memory controller 315, and one or more input and/or output (I/O) devices (or peripherals) 10, 345 that are communicatively coupled via a local input/output controller 335. The input/output controller 335 can be, but is not limited to, one or more buses or other wired or wireless connections, as is known in the art. The input/output controller 335 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 345 may generally include any generalized cryptographic card or smart card known in the art.

The processor 305 is a hardware device for executing software, particularly that stored in memory 310. The processor 305 can be any custom made or commercially available processor, a central processing unit (CPU), an auxiliary processor among several processors associated with the computer 301, a semiconductor based microprocessor (in the form of a microchip or chip set), a macroprocessor, or generally any device for executing software instructions.

The memory 310 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 310 can have a distributed architecture, where various components are situated remote from one another, but can be accessed by the processor 305.

The software in memory 310 may include one or more separate programs, each of which comprises an ordered listing of executable instructions for implementing logical functions, notably functions involved in embodiments of this invention.

The software in memory 310 shall also typically include a suitable operating system (OS) 311. The OS 311 essentially controls the execution of other computer programs, such as the record linkage algorithm 120. The record linkage algorithm 120 may for example comprise a database management system or a Java application. The record linkage algorithm may comprise components for performing the bucketing step, the scoring step and the classification steps respectively. The record linkage algorithm may further comprise a component for performing standardization of data records (e.g., before performing the bucketing, scoring and the classification steps). The standardization refers to a process of transforming data to a predefined data format. The data format may include a common data definition, format, representation and structure. The data that is to be transformed is the data that is not conforming to the predefined data format. For example, the process of transforming the data may comprise processing the data to automatically transform the data where necessary to comply with those common representations that define the data format. This process of transforming data may include identifying and correcting invalid values, standardizing spelling formats and abbreviations, and validating the format and content of the data.

The methods described herein may be in the form of a source program, executable program (object code), script, or any other entity comprising a set of instructions to be performed. When a source program, then the program needs to be translated via a compiler, assembler, interpreter, or the like, which may or may not be included within the memory 310, so as to operate properly in connection with the OS 311. Furthermore, the methods can be written as an object oriented programming language, which has classes of data and methods, or a procedure programming language, which has routines, subroutines, and/or functions.

In example embodiments, a conventional keyboard 350 and mouse 355 can be coupled to the input/output controller 335. Other output devices such as the I/O devices 345 may include input devices, for example but not limited to a printer, a scanner, microphone, and the like. Finally, the I/O devices 10, 345 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 345 can be any generalized cryptographic card or smart card known in the art. The system 101 can further include a display controller 325 coupled to a display 330. In example embodiments, the system 101 can further include a network interface for coupling to a network 365. The network 365 can be an IP-based network for communication between the computer 301 and any external server, client and the like via a broadband connection. The network 365 transmits and receives data between the computer 301 and external systems 30, which can be involved to perform part or all of the steps of the methods discussed herein. In example embodiments, network 365 can be a managed IP network administered by a service provider. The network 365 may be implemented in a wireless fashion, e.g., using wireless protocols and technologies, such as WiFi, WiMax, etc. The network 365 can also be a packet-switched network such as a local area network, wide area network, metropolitan area network, Internet network, or other similar type of network environment. The network 365 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 301 is a PC, workstation, intelligent device or the like, the software in the memory 310 may further include a basic input output system (BIOS) 312. The BIOS is a set of essential software routines that initialize and test hardware at startup, start the OS 311, and support the transfer of data among the hardware devices. The BIOS is stored in ROM so that the BIOS can be executed when the computer 301 is activated.

When the computer 301 is in operation, the processor 305 is configured to execute software stored within the memory 310, to communicate data to and from the memory 310, and to generally control operations of the computer 301 pursuant to the software. The methods described herein and the OS 311, in whole or in part, but typically the latter, are read by the processor 305, possibly buffered within the processor 305, and then executed.

When the systems and methods described herein are implemented in software, as is shown in FIG. 3, the methods can be stored on any computer readable medium, such as storage 320, for use by or in connection with any computer related system or method. The storage 320 may comprise a disk storage such as HDD storage.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

In another example, a method for matching data records stored in a master data management system is provided. The method comprises: assigning a group of a predefined set of groups to the individual data records; selecting a matching algorithm based on the group from a set of predefined matching algorithms; and applying the determined matching algorithm to at least two data records of the group. In one example, the application of the matching algorithm comprises: assigning the respective data record to a bucket; calculating a score from a pair of data records belonging to the same bucket, the score characterizing a level of similarity of the records; and classifying the pair of data records based on the calculated score.

Possible combination of features described above can be the following:

1. A method for centrally processing data records using a record linkage algorithm, the method comprising:
   providing a centralized master repository for storing the data records in a predefined data structure having a set of attributes;
   providing at least one clustering metric as function of at least part of the set of attributes of a data record;
   determining clusters of records using a clustering function and the clustering metric as input of the clustering function;
   defining for each cluster a respective set of configuration data of the record linkage algorithm based on the values of the clustering metric within the cluster;
   assigning the individual records to one or more respective clusters of the clusters using the clustering metric values of the individual data records;
   applying the record linkage algorithm to a set of two or more records assigned to at least one cluster using the set of configuration data associated to the at least one cluster.

2. The method of feature combination 1, the clustering metric comprising at least one of:
   completeness of a data record, the completeness characterizing a ratio of number of attributes of the data record comprising data values to a total number of attributes in the set of attributes;
   location of the data record specifying the geographic context related to an entity described by the data record.

3. The method of any of the previous feature combinations, the determining of the clusters using the clustering function comprising: associating with the clustering metric a respective set of metric thresholds, the set of metric thresholds defining clusters boundaries of the clusters.

4. The method of any of the previous feature combinations, further comprising receiving data records from client systems, and storing the received data records in the master repository until reaching a predefined set of records, the set of records comprising the individual records.

5. The method of feature combination 3, further comprising dynamically determining the set of metric thresholds based on the individual data records, the dynamically determining comprising determining the metric thresholds such that the number of records per cluster is higher than a predefined minimum number of records.

6. The method of any of the previous feature combinations, the clustering function comprising one of k-means clustering, and neural networks.

7. The method of any of the previous feature combinations, further comprising: in response to the assigning of a given record to more than one cluster, repeating the assigning and the applying steps on a predefined time periodic basis for the given record.

8. The method of any of the previous feature combinations, the set of configuration data comprising at least one of:
   a list bucketing attributes of the set of attributes that can be used for a bucketing step of the record linkage algorithm,
   a list of matching attributes of the set of attributes that can be used for matching between records in a matching step of the record linkage algorithm,
   the minimum number of common attributes that can be used for the bucketing and matching steps,
   the maximal size of the records per cluster,
   the type of comparison functions for the matching step,
   maximal number of different bucketing methods,
   an indication of a blocking or bucketing method for the bucketing step.

9. The method of any of the previous feature combinations, the applying of the record linkage algorithm comprising:
   assigning records of the set to one or more buckets using one or more bucketing attributes of the set of attributes; and
   for each bucket and each pair of records of the each bucket: estimating the matching probability and/or non-matching probability for matching attributes of the set of attributes; and using the probabilities for classifying the pair as a match pair, possible match pair or non-match pair.

10. The method of feature combination 9, further comprising using the probabilities for calculating a matching score for the pair of records, wherein the classification is performed by comparing the matching score with one or more predefined classification thresholds.

11. The method of feature combination 9, in case the number of pairs classified as non-match pairs is higher than a predefined maximum number, repeating the steps of claim 9 using other bucketing attributes.

12. The method of feature combination 9, in case the pair is classified as a possible match pair, repeating the estimation of the matching probability and/or non-matching probability for the matching attributes using other matching functions.

13. The method of feature combination 9, in case the pair is classified as a match pair executing a survivorship algorithm on the pair of records.

14. The method of feature combination 10, the calculating of the matching score comprising:
   using the probabilities to calculate an individual matching score for each attribute of the matching attributes;
   calculating the composite score from the individual matching scores of all the matching attributes, wherein the matching score comprises the composite score.

15. The method of any of the previous feature combinations 9-14, the matching attributes comprising the bucketing attributes.

16. The method of feature combination 10, the calculating of the matching score being iteratively performed comprising:
   providing a ranked list of one or more matching functions;
   executing the highest ranked matching function;
   comparing the matching score with a predefined threshold;
   in case the matching score is smaller than the predefined threshold exiting the iteration process;
   in case the matching score is higher than the predefined threshold, repeating the executing and comparing steps with a following ranked matching function until all matching functions are processed.

17. The method of any of the previous feature combinations, assigning individual records to respective cluster of the clusters using the clustering metric of the data record comprising:
   calculating the clustering metric for the data record;
   assigning the data record to a cluster whose boundaries encompass the calculated clustering metric.

18. The method of any of the previous feature combinations, the applying of the record linkage algorithm being performed in case one of the following criterion is fulfilled:
   at least one record of the set is a new record that is received for storage on the master repository;
   the content of at least one record of the set is changed by an update or change operation of the master repository.

19. The method of feature combination 18, further comprising:
   calculating a current value of the clustering metric of the changed data record;
   in response to determining that the current value is different from the previous value of the clustering metric of the changed record, reassigning the changed record to a corresponding cluster based on the current value.

20. The method of any of the previous feature combinations, wherein the set of records are received from respective client systems.

21. The method of any of the previous feature combinations, being performed at real-time.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for centrally processing data records using a record linkage algorithm, the method comprising:
   providing a centralized master repository for storing data records in a predefined data structure having a set of attributes;
   providing a plurality of clustering metrics as a function of at least part of the set of attributes of an individual data record from a plurality of data records, wherein each clustering metric includes a set of metric thresholds defining a plurality of value ranges for the clustering metric;
   determining a plurality of clusters of records using a clustering function that is based on the plurality of clustering metrics;
   defining sets of configuration data for the record linkage algorithm, wherein each set of configuration data is assigned to a group of value ranges comprising a value range from each clustering metric, and wherein at least two of the groups of value ranges are assigned to different sets of configuration data for the record linkage algorithm;
   assigning individual data records from the plurality of data records to the plurality of clusters using clustering metric values of the individual data records from the plurality of data records;
   in response to assigning the individual data records to the plurality of clusters, applying the record linkage algorithm to a set of one or more pairs of individual data records within each of the plurality of clusters, wherein applying the record linkage algorithm comprises:
      determining, at real-time, the set of configuration data associated with each of the clusters based on values of the clustering metrics within that particular cluster, wherein determining the set of configuration data for each cluster comprises:
         comparing the values of the clustering metrics for a cluster to the value ranges within the groups of value ranges assigned to the sets of configuration data; and identifying the set of configuration data assigned to the group having value ranges including the values of the clustering metrics for the cluster, wherein at least two clusters have different sets of configuration data for applying the record linkage algorithm to the one or more pairs of individual data records within each of the at least two clusters;

assigning individual data records from the set of one or more pairs of the individual data records of each of the clusters to one or more buckets by applying the record linkage algorithm with one or more bucketing attributes from the set of configuration data determined at real-time for each of the clusters;

determining matching scores for the assigned individual data records in the one or more buckets of each of the clusters by applying the record linkage algorithm with matching parameters from the set of configuration data determined at real-time for each of the clusters; and classifying the assigned individual data records in the one or more buckets of each of the clusters with respect to matching based on the matching scores and by applying the record linkage algorithm with classification parameters from the set of configuration data determined at real-time for each of the clusters.

2. The method of claim 1, wherein the plurality of clustering metrics comprises at least one of:
a completeness indication of a particular individual data record, the completeness indication characterizing a ratio of a number of attributes of the particular individual data record with data values to a total number of attributes in the set of attributes; and
a location indication of the particular individual data record specifying a geographic context related to an entity described by the particular individual data record.

3. The method of claim 1, wherein the sets of metric thresholds for the plurality of clustering metrics define cluster boundaries of the clusters.

4. The method of claim 1, further comprising:
receiving the data records from client systems; and
storing the received data records in the centralized master repository until reaching a predefined set of records.

5. The method of claim 3, further comprising:
dynamically determining the sets of metric thresholds for the plurality of clustering metrics based on the individual data records included in the plurality of data records, so that the number of individual data records included in each particular cluster of the clusters is higher than a predefined minimum number of records.

6. The method of claim 1, wherein the clustering function comprises at least one of k-means clustering, and neural networks.

7. The method of claim 1, further comprising:
in response to assigning a particular individual data record to more than one cluster, repeating the assigning to the plurality of clusters and the applying steps on a predefined time periodic basis for the particular individual data record.

8. The method of claim 1, wherein each set of configuration data comprises at least one of:
a list of bucketing attributes from the set of attributes that can be used for a bucketing step of the record linkage algorithm;
a list of matching attributes from the set of attributes that can be used for matching between records in a matching step of the record linkage algorithm;
a minimum number of common attributes that can be used for the bucketing step and the matching step;
a maximal size of the records per cluster;
a type of comparison functions for the matching step;
a maximal number of different bucketing methods; and
an indication of a blocking method or a bucketing method for the bucketing step.

9. The method of claim 1, wherein the applying of the record linkage algorithm comprises:
for two records of each bucket:
estimating one or more of a matching probability and a non-matching probability for matching attributes from the set of attributes;
using the one or more estimated probability to classify the two records as a match pair, possible match pair, or non-match pair.

10. The method of claim 9, further comprising:
calculating a matching score for the two records using the one or more estimated probability, wherein the classification is performed by comparing the matching score with one or more predefined classification thresholds.

11. The method of claim 9, further comprising:
repeating the assigning to the plurality of clusters and the applying steps using other bucketing attributes when a number of pairs of records classified as non-match pairs is higher than a predefined maximum number.

12. The method of claim 9, further comprising:
repeating the estimating of the one or more probability for the matching attributes of the two records using other matching functions when the two records are classified as a possible match pair.

13. The method of claim 9, further comprising:
executing a survivorship algorithm on the two records when the two records are classified as a match pair.

14. The method of claim 10, wherein the matching score comprises a composite score and calculating the composite score comprises:
calculating an individual matching score for each attribute of the matching attributes using the one or more estimated probability;
calculating the composite score from the individual matching scores of all the matching attributes.

15. The method of claim 10, wherein calculating of the matching score is iteratively performed and further comprises:
providing a ranked list of one or more matching functions;
executing a highest ranked matching function to determine the matching score;
comparing the matching score with a predefined threshold;
repeating the executing and comparing steps with a next highest ranked matching function when the matching score is higher than the predefined threshold, until all matching functions are processed.

16. The method of claim 1, wherein the assigning of the individual data records from the plurality of data records to the plurality of clusters further comprises:
calculating the clustering metric value for a particular individual data record;
assigning the particular individual data record to a particular cluster of the clusters whose boundaries encompass the calculated clustering metric value.

17. The method of claim 1, wherein the applying of the record linkage algorithm is performed when one or more of the following criterion is fulfilled:
- at least one individual data record of the plurality of data records is a new record that is received for storage on the master repository; and
- content of at least one individual data record of the plurality of data records is changed by an update or change operation of the master repository.

18. The method of claim 17, further comprising:
- calculating a current value of a particular clustering metric of a changed individual data record;
- reassigning the changed record to a corresponding cluster based on the current value when the current value is different from a previous value of the clustering metric of the changed record.

* * * * *